(No Model.)
R. & E. LONG.
PILE DRIVER.
No. 262,067. Patented Aug. 1, 1882.
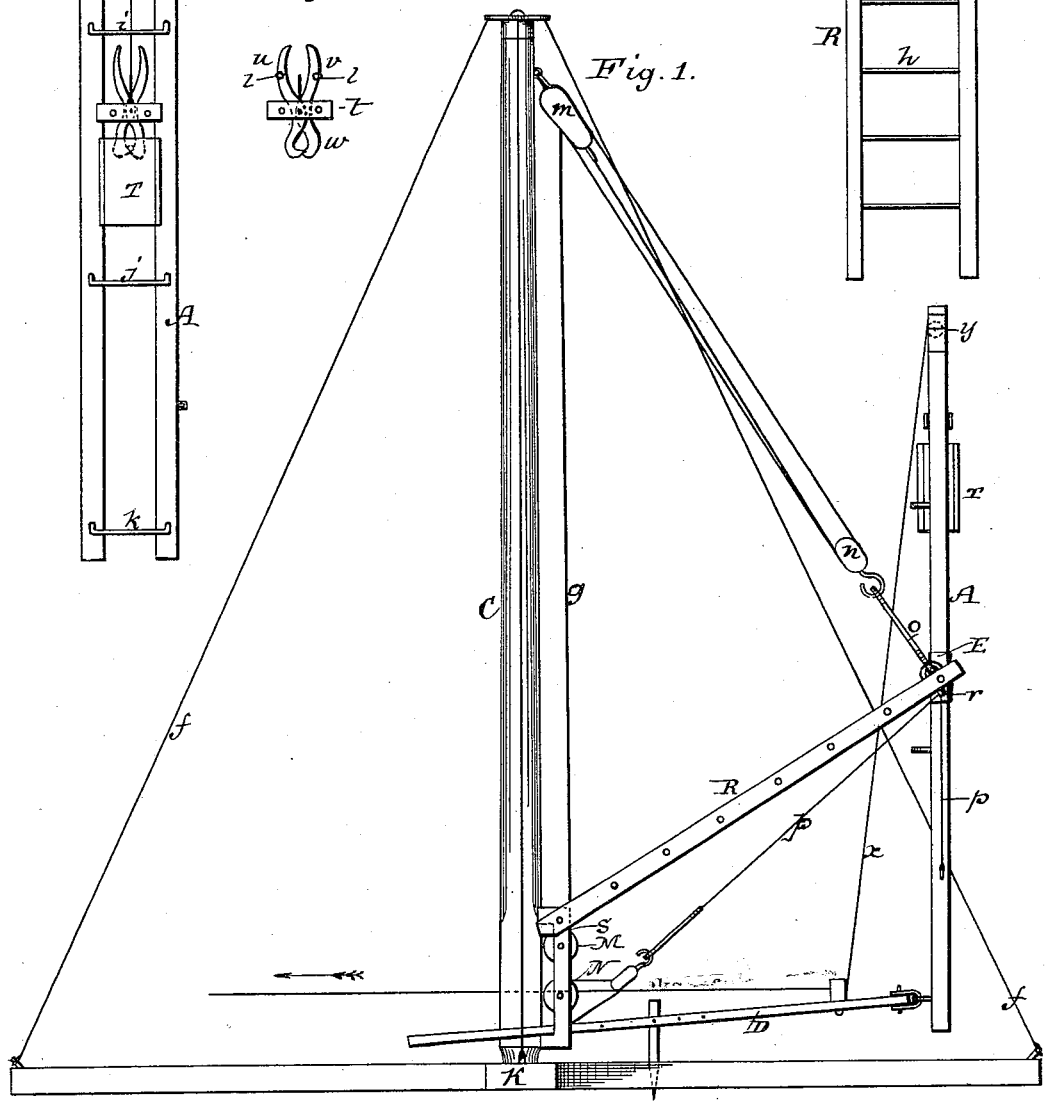
Witnesses:
W. B. Masson
E. E. Masson
Inventors
Richard Long & Edwin Long
By T. C. Woodward
atty.

UNITED STATES PATENT OFFICE.

RICHARD LONG AND EDWIN LONG, OF IOWA CITY, IOWA.

PILE-DRIVER.

SPECIFICATION forming part of Letters Patent No. 262,067, dated August 1, 1882.

Application filed May 21, 1881. Renewed June 15, 1882. (No model.)

*To all whom it may concern:*

Be it known that we, RICHARD LONG and EDWIN LONG, residents of Iowa City, in the county of Johnson, in the State of Iowa, have invented a new, useful, and important Improvement in Pile-Drivers, described in this specification and its accompanying drawings.

Figure 1 is a side view of one form of the invention in position for use. Figs. 2, 3, 4, 5, and 6 are detail views of the same.

Our invention consists in the attachment of hammer-guides to the boom of a common derrick and in mechanism for operating the hammer-guides and hammer.

In the form of construction shown the boom R is pivoted to a frame, S, bolted to the mast C. The boom is in the form of a ladder, and at its outer end has pivoted slides E E, in which the hammer-guides A A slide when raised or lowered, or may be inclined. The boom is held in position and raised or lowered to move the hammer-guides in or out from the mast by rope $g$, geared windlass M, tackle $m$ $n$, and bail $o$. The hammer guides are held in position and raised, lowered, or inclined by ropes $p$, one on each side of the boom, and passing over pulleys, one on each outer end of the sides thereof, geared windlass N, pulleys $r$, and adjustable brace D. The mast rests on a pivot-block, K, and is held vertically by guy-ropes $f$. The hammer T is supported by rope $x$, pulley $y$, and shears $w$ between the hammer-guides. The shears are pivoted to a slide, $t$, between the hammer-guides, and have arms $u$ $v$, that close by their own weight under the bail $w'$ of the hammer. The shears are opened to drop the hammer by contact with the trip-wedges $a$ $a$ at the upper end of the hammer-guides. The arms of the shears or the trip-wedges have anti-friction rollers $l$ $l$. The hammer-guides are connected by bent rods $i$ $j$ $k$ to clear the hammer as it is raised or falls. The sides of the boom are connected by rods $h$; but the boom may be made in a single piece. The hammer has grooves $z$ to receive the hammer-guides.

The invention is intended for driving piles at creeks, rivers, and other places for bridges and foundations of other structures where it would be difficult to use a platform-crane or platform and hammer-guides which require to be moved for each pile driven. The mast can be set on planks, and stakes driven for the guy-ropes, so that the hammer-guides and boom can make a full revolution under the guy-ropes. The hammer-guides can be adjusted to drive piles at any angle and in different positions without moving the mast, which affords a great saving of time and labor, and is a great convenience over the old plan.

The details of construction and operation may be varied within the scope of our improvements.

We claim as our invention—

1. The combination of a mast, a boom, hammer-guides, and mechanism to move the boom in or out from the mast and to move the hammer-guides up or down or to an incline, substantially as described.

2. The combination of a mast, a boom, hammer-guides, slides, and operating mechanism, substantially as described.

3. The combination, with a mast, a boom, and hammer-guides, of pulleys on the sides of the boom, ropes on the pulleys, bail, and windlass, substantially as described.

4. The combination, with a mast, a boom, and hammer-guides, of ropes, tackle, and windlasses, substantially as described.

5. The combination of hammer-guides, trip-wedges, shears having anti-friction rollers, slides, and operating mechanism, substantially as described.

6. The combination of a mast, a boom, hammer-guides, shears, hammer, and supporting and operating mechanism, whereby the hammer can be dropped at various points around the mast, substantially as set forth.

In testimony whereof we hereunto subscribe our signatures, in the presence of two attesting witnesses, on the 18th day of April, 1881.

RICHARD LONG.
EDWIN LONG.

Witnesses:
R. R. SPENCER,
WM. A. FRY.